United States Patent Office 2,920,354
Patented Jan. 12, 1960

2,920,354
PROCESS FOR MAKING SPACED REINFORCEMENTS ON SHAPED ELONGATE STRUCTURES FROM FIBER-FORMING MATERIALS

Erhard Zumbrunnen, Magliaso, Lugano, Switzerland, assignor to Viso S.A., Magliaso, Lugano, Switzerland Application August 14, 1957, Serial No. 678,165

8 Claims. (Cl. 18—59)

The present invention relates to a process for making spaced reinforcements on shaped elongate structures from fiber-forming materials.

This is a continuation-in-part of my copending application Ser. No. 591,953, filed June 18, 1956, now abandoned.

It is known to reinforce elongate structures from fiber-forming materials at spaced intervals by forming points of reinforcement through tieing of knots. In a similar manner, the joining of more than one elongate structure, e.g. for the formation of a net, is performed by the tieing of knots.

In the reinforcement of longitudinal structures from oriented fully synthetic products, the method of tieing knots is unsatisfactory, particularly when nets are made, because the material loses a great deal of its strength, and because without preliminary preparation of the material, the knots as a rule cannot be maintained slip-free.

It is the object of the present invention to provide a method which overcomes the above mentioned drawback. According to the invention, elongate structures of oriented fiber-forming materials, e.g. natural or synthetic silk, yarns, braids, strings, wires, and so on, can be reinforced without impairment of their molecular orientation and, consequently, their strength, by applying thereto a thermoplastic synthetic material in molten state either to the single threads, or e.g. in net formation, at the crossing points of threads, in such a way that the elongate structure is powerfully chilled immediately before applying the reinforcement thereto.

In a further embodiment of the process according to the invention, in addition to the structures to be reinforced, the molds may likewise be cooled, at least the surfaces of the molds facing the structures to be reinforced.

In the following, the process according to the invention will be more fully described with reference to the accompanying drawings, but it should be understood that these are given by way of illustration and not of limitation and that many changes in the details can be made without departing from the spirit of the invention.

In the drawings,

Fig. 1 diagrammatically illustrates the mode of operation for spaced reinforcement of longitudinal structures and a device for effecting it;

Figure 4:
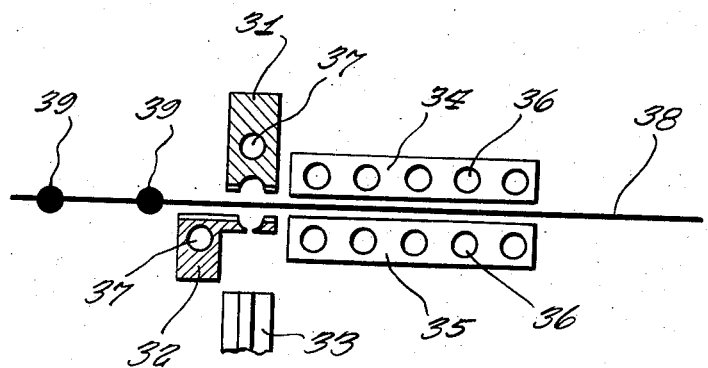
Figure 5:
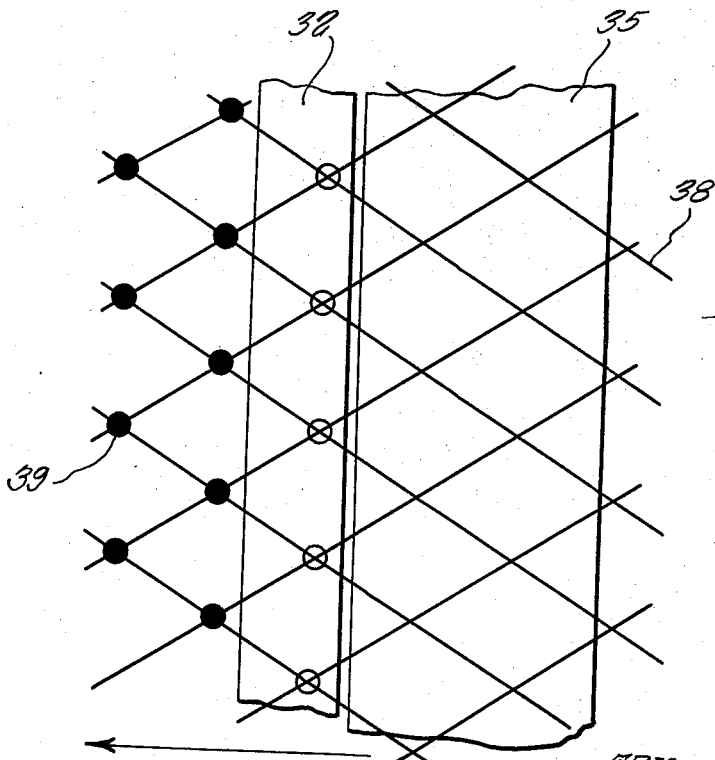

Fig. 4 diagrammatically illustrates an injection mold for reinforcement of crossing points of a net; and Fig. 5 is a plan view of the device shown in Fig. 4 with one part of the mold and the cooling member taken off.

Figure 1:
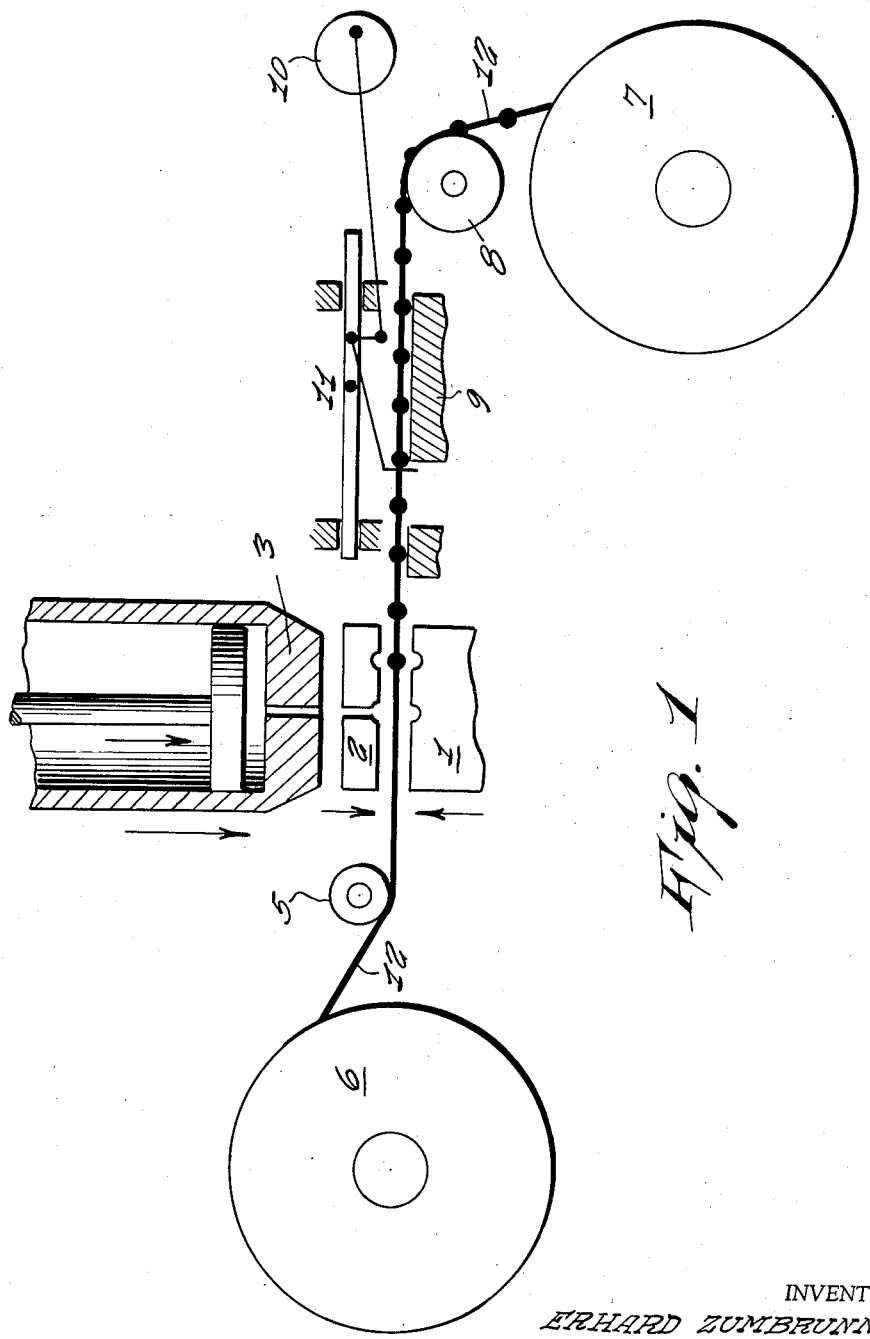

Fig. 1 illustrates an injection mold having two dies 1 and 2 between which a string 12 is being passed. The string consists of a linear synthetic structure; a bobbin 6 is provided from which the structure is reeled off and passed to the dies over a guide roller 5. Above the upper die 2, a container 3 is arranged which is adapted to dispense a polyamide melt under the action of a piston 4. Beyond the dies, a track 9 and a guide roller 8 are arranged over which the string 12 is passed to a take-up roller 7. A system of catchers 11 actuated by a cam 10 serves for step-wise advancement of the string as described hereinbelow.

The device operates as follows:

The string 12, e.g. of synthetic linear polyamide of the type nylon 6, is running off from the bobbin 6, passing the guide roller 5, the injection mold formed by the dies 1 and 2, the second guide roller 8, and is wound up by the take-up roller 7.

At regular intervals the string is stopped, the injection mold closed and simultaneously the container 3, equipped with a nozzle, is attached to the injection die 2. By pressing the piston 4, the polyamide melt enters the injection die and the string is reinforced.

Meanwhile the system of catchers is pushed in the direction of the injection die and catches the string behind a thickened spot. In the same moment in which the injection die is opened, the catchers are retracted by rotating the cam 10 and the string is moved on by a definite adjustable length in the direction of the take-up roller.

Figure 2:
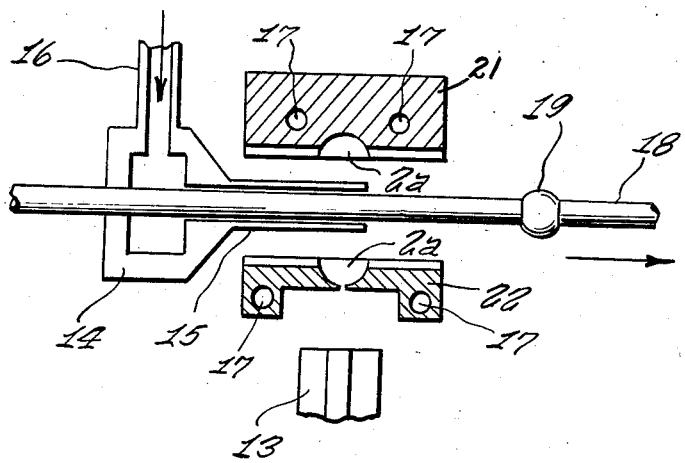
Fig. 2 shows a detail of an opened mold in section.
Figure 3:
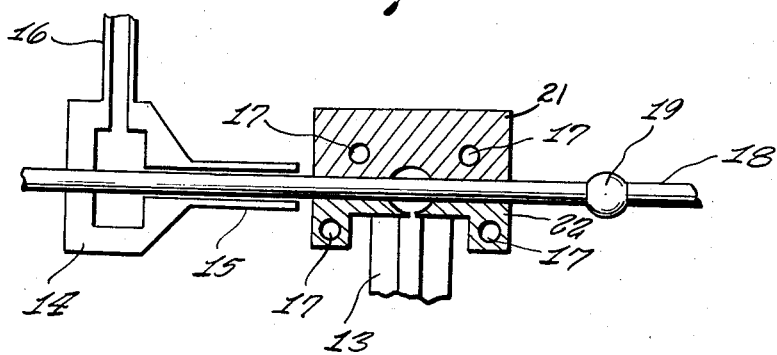
Fig. 3 shows the same part in closed position.

Figs. 2 and 3 illustrate the cooling arrangement for the elongate structure and for the parts of dies 21 and 22 facing the structure. The dies 21 and 22 have ducts 17 arranged therein, through which a heating medium, for instance oil, is maintained in circulation. The oil has a temperature of about 100° C. The cooling device, which is arranged ahead of the dies in the sense of travel of the fiber, consists of a chamber 14 and a pipe 15 forming an extension thereof. Another pipe 16 opening into chamber 14 admits gas cooled to 0° C., for instance air or nitrogen which moves through pipe 15 along the fiber structure, designated by 18, and then escapes to the atmosphere; in the passage, the gas cools not only the fiber structure, but also the dies facing the same. Each die has a depression, 2a, for receiving the molten material to be applied to the fiber structure 18.

The closing of the dies is synchronized (by means not shown) with a retraction of chamber 14 and pipe 15, the admission of gas being interrupted simultaneously. At the same time, a nozzle 13 for admission of molten thermoplastic material is brought up into contact with die 12 and the material fills the depression 2a. A bead-like reinforcement 19 is thereby formed on fiber 18. Thereafter, the dies are opened and the fiber is advanced in the direction of the arrow (Fig. 2).

In Fig. 4 the formation of a net-like structure from two fibers is illustrated. The dies are designated by 31 and 32, the injection nozzle by 33. The fiber 38 is passed between two members 34 and 35 having a plurality of passages 36 for the flow of a cooling medium therethrough. As more clearly shown in Fig. 5 the fibers are arranged in the form of a net before being passed through the cooling members and through the dies 31 and 32 arranged adjacent thereto.

For making the reinforcement and for joining the fibers together at crossing points, dies 31 and 32 are pressed together and the nozzle 33 is brought to bear on die 32, whereupon the melt which is used for making the reinforcement passes through the nozzle unto the fibers. Subsequently, dies 31 and 32 are opened and the net, which now has the reinforcement points 39 formed thereon, will be advanced for a desired distance, so that the next set of crossing points will be placed in the proper position. The cooling members have a cooling gas passing through their channel 36, for instance air which is cooled down to 0°. Channel 37 of the dies serves for circulation of a heating medium, e.g. oil, of about 100° C.

The temperature of the melt from which the reinforcement points are formed and the rate at which the injection is carried out have in each case to be adapted to the injected material and the size of the reinforcement. Assuming the fiber structure to have a diameter of 4 mm. and the desired reinforcement to be 8 mm., the injection rate is about 6 beads per minute. When a polyamide is used as the injection melt, the temperature will be 245° C. for nylon 6 and about 285° C. for nylon 66. When polystyrene is used the temperature is from 160–170° C. and when polyvinyl chloride is used, about 180° C. As fiber structures I may use threaded yarns of polyglycol terephthalate, polyamides, or natural fibers, such as cotton, sisal, ramie, and others.

Similarly to threaded yarns, single filament fibers of polyamides, polyesters and the like may be reinforced at spaced points by the injection process used according to the present invention.

The products so made may be used in many technical fields. When nets are made, it has been observed that they do not show any loss of strength at the crossing points, such as is often the case in tied nets, with the added advantage that the crossing points are completely slip-free.

Due to the ball-shaped crossing points, nets used for fishing have the advantage of diminishing water-resistance and eddy-formation, since spheres naturally have the least tendency to eddy-formation when the nets are moved in the water.

When thermoplastic material of elongate shape is reinforced at spaced points this may be used, for instance, for making drive belts. Such belts exhibit a completely slip-free operation when used on appropriately shaped surfaces of driving wheels, a fact which permits to dispense with continuous supervision or handling, for instance tensioning, and without special arrangements being made for keeping the belts in place during operation.

Some attempts have already been made to unite parts originally made by injection molding by placing them again into a mold and joining them by thermoplastic material. However, these are not structures made of oriented fibers, so that no care has to be taken to avoid destruction of the orientation; or, in other cases, such destruction and loss of strength is accepted so that many uses, for which the present reinforced structures are applicable, such as belts for driving, are not feasible.

When synthetic material is to be reinforced, it is not necessary that the thermoplastic synthetic, which is used as reinforcement material, is the same as the one which is used as base material, but it may be a material of the same kind with a higher or lower melting point than the base material; it may, however, also be an entirely different thermoplastic material as regards its chemical constitution, than the one used for the production of the elongate structure.

What I claim is:

1. A process for the reinforcement, at spaced locations, of elongated structures of oriented fiber-forming materials, which comprises subjecting said structures to powerful cooling by means of a cooling gas while being passed through an injection mold with open dies immediately before applying to said structures a thermoplastic synthetic material, said cooling gas acting simultaneously on said structures and on the surfaces of the dies facing the same to prevent a weakening of the elongate structures by the influence of heat.

2. The process according to claim 1, wherein both the elongated structures and the thermoplastic synthetic material are a polymeric synthetic, selected from the group consisting of polyamides and polyesters.

3. The process according to claim 1, wherein the cooling a performed by means of a gas cooled down to about 0° C.

4. The process according to claim 1, wherein several elongate structures are joined by application of thermoplastic synthetic material.

5. The process according to claim 1, which comprises making a net with reinforced crossing points by application of thermoplastic synthetic material to said points.

6. The process according to claim 1, wherein the synthetic material applied to said structures has a lower melting point than the material of which the structure consists.

7. The process according to claim 1, wherein the synthetic material applied to said structures has a higher melting point than the material of which the structure consists.

8. The process according to claim 1, wherein the elogate structures consist of natural fibers.

References Cited in the file of this patent
UNITED STATES PATENTS

| | | |
|---|---|---|
| 2,439,716 | Canfield et al. | Apr. 13, 1948 |
| 2,500,258 | Mazzoni | Mar. 14, 1950 |
| 2,632,921 | Kreidl | Mar. 31, 1953 |